Oct. 31, 1967 J. F. MIFSUD 3,349,866
DIRECTIVE TRANSDUCER ARRAY FOR SEISMIC EXPLORATION
Filed April 19, 1963 6 Sheets-Sheet 1

Joseph F. Mifsud INVENTOR.
BY John D. Dassett
ATTORNEY

Joseph F. Mifsud INVENTOR.

BY John D. Dassett
ATTORNEY

Oct. 31, 1967 J. F. MIFSUD 3,349,866
DIRECTIVE TRANSDUCER ARRAY FOR SEISMIC EXPLORATION
Filed April 19, 1963 6 Sheets-Sheet 4

Joseph F. Mifsud INVENTOR.

BY John D. Gassett
ATTORNEY

Joseph F. Mifsud INVENTOR.

BY John D. Dassett

ATTORNEY

United States Patent Office 3,349,866
Patented Oct. 31, 1967

3,349,866
DIRECTIVE TRANSDUCER ARRAY FOR
SEISMIC EXPLORATION
Joseph F. Mifsud, Tulsa, Okla., assignor, by mesne assignments, to Esso Production Research Company, Houston, Tex., a corporation of Delaware
Filed Apr. 19, 1963, Ser. No. 274,086
14 Claims. (Cl. 181—.5)

This invention relates to improvements in the art of seismic exploration. It is more especially concerned with improving the directivity of an array of seismic transducers such as seismic signal sources and/or geophones. It is especially concerned with the arrangement of transducers within an array.

The method commonly employed in searching for petroleum or other mineral deposits is what is known as seismic prospecting wherein a seismic disturbance is initiated at a selected point in or near the earth's surface to direct seismic waves downwardly into the earth from that point. The waves continue to travel downwardly within the earth until they encounter discontinuities in the earth's structure and composition in the form of various substrata formations and the like. These discontinuities have the effect of reflecting a portion of the seismic waves back toward the surface of the earth. Sensitive pickups, sometimes called seismic detectors, seismometers, transducers or geophones, are arranged at detection points along the earth to translate the detected earth motion into electrical impulses which after suitable amplification are recorded. The signal recorded then is usually indicative of the character of the ground motion and of the position of the reflecting beds and are usually referred to collectively as a seismic signal which is in effect a composite signal made up of a plurality of electrical signals varying in frequency and amplitude. The electrical signals oscillate about a no-signal zero voltage or quiescent record base line. The seismic signal thus detected and recorded is then processed and displayed in various ways.

Although it is theoretically possible to time the arrival of a reflected seismic wave by the use of a single geophone and recording device, in practice it is usually difficult and sometimes impossible to pick out useful reflection waves from a number of other earth vibrations that are detected and recorded at the same time. Therefore, the usual practice has been to employ a plurality of seismometers spread over a considerable distance along the earth's surface in a selected pattern as just described and to make a plurality of traces in side-by-side relations on a single chart for purpose of comparison. A reflection from a well defined stratum will appear on the record as a waveform of increased amplitude on all the traces in some definite time relation, thus permitting the reflection to be identified on the record.

In obtaining suitable reflections in the record in most prospecting areas, a plurality of geophones are preferably used as a single detection station and their outputs connected so as to add and form one composite signal. The signals thus combined are recorded as a single trace on the record. The hope is to improve the ratio of essentially vertically traveling reflection energy to essentially horizontally traveling interference energy. This serves to average out some of the complex earth motions associated with the seismic disturbance, however such use of multiple geophones has left much to be desired.

In the method of the present invention, lateral resolution is improved. Discrimination against near horizontal traveling signals is also obtained. In accordance with the present invention, the seismic frequency band is divided into a number of smaller frequency bands. The seismic frequency band of interest can range from about 10 c.p.s. to about 150 c.p.s. or more; however, the normal range of interest is from about 20 cycles per second to about 80 cycles per second. The wide seismic band is then divided into a number of smaller frequency bands or sub-bands, e.g., 20 to 24 cycles per second, 24 to 29 cycles per second, etc. An example of selecting the smaller frequency bands will be given in detail hereinafter. A geophone sub-array for each of the smaller frequency sub-bands is chosen. The sub-arrays are designed such that the directivity pattern of each array for the several sub-bands are the same. The output from each geophone sub-array is filtered for the frequency band assigned to it. The filtered outputs from all the sub-arrays are then combined to obtain the final trace or seismogram for the overall geophone detection station. The final signal has essentially the same directivity pattern for each of the various frequency components of the signal. This improves lateral resolution.

Various objectives and a better understanding of the invention can be had from the following description taken in conjunction with the drawings in which.

Figure 1:
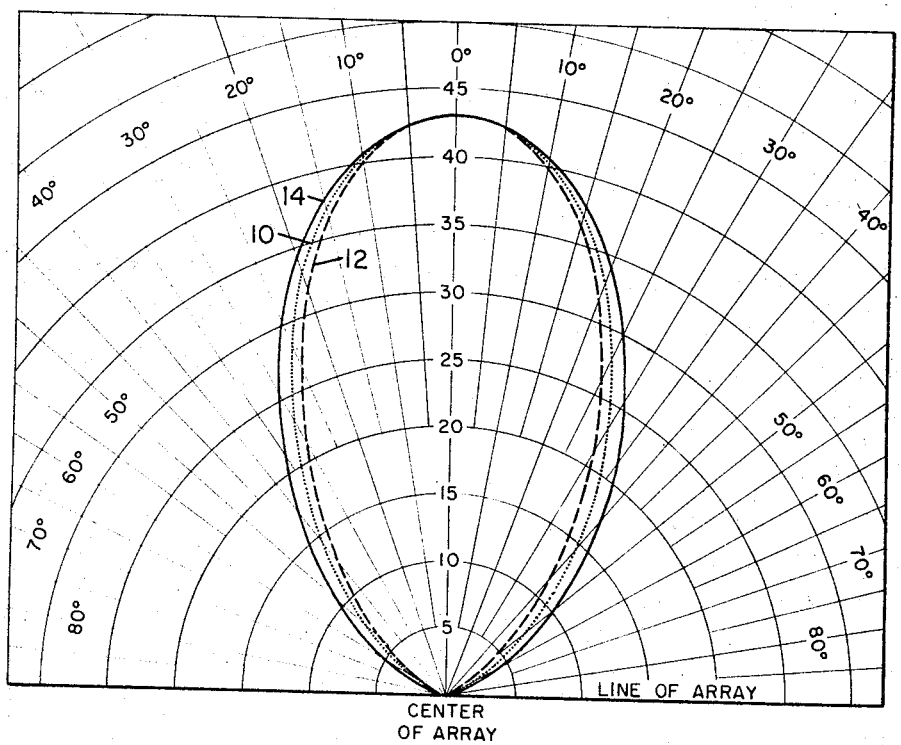
FIG. 1 shows the directivity patterns in the vertical plane through an array for a compressional wave at three different frequencies.

In the practice of this invention, the seismic band is divided into a number of small frequency bands or "sub-bands." Each sub-band has a sub-array of geophones. Consideration will first be given to general equations (including a specific example) useful in determining the number of geophones in each sub-array and the length of such sub-array to achieve substantially the same directivity pattern for each of the various arrays. Consideration will also be given to determining the spacing between geophones. Consideration will also be given to determining the width of the frequency sub-band. In a sub-band the following formulae apply:

(1) $$\Delta f = f_2 - f_1$$
and
(2) $$f_0 = \frac{f_1 + f_2}{2}$$

Where $\Delta f$ is the bandwidth of a sub-band, $f_1$ is the lowest frequency in the sub-band, $f_2$ the highest frequency, and $f_0$ the center frequency.

Spacing between the individual geophones for the sub-array of each sub-band to aid in discriminating against near horizontal traveling signals is given by the following formula:

(3) $$s = 1/2 \frac{v_r}{f_2}$$

where $v_r$ is the Rayleigh wave velocity.

The number of geophones in a sub-array is chosen in a manner to obtain a selected directivity pattern; for example a narrow major lobe and small side lobes in the directivity pattern. In practice a compromise is made between the narrowness of the major lobe and the size of the side lobes. The equation for determining the directivity pattern is given below in Equation 4.

$$(4) \qquad e\beta = \frac{\sin n\Psi}{\sin \Psi} \cos \beta$$

where $\beta$=the angle measured in a plane through the array from the normal at the center of the array, $e\beta$ is the signal magnitude (such as voltage) generated by a wave incident at the angle $\beta$. $\Psi$ is defined in Equation 5.

$$(5) \qquad \Psi = \left[\frac{\pi s}{\lambda_c}\right] \sin \beta$$

where $s$=the geophone spacing
$\lambda_c$=the compressional wave length
Cos $\beta$= the directivity of an individual vertical geophone for an incident compressional wave. (Cos $\beta$ is also the directivity of surface sources such as vibrators but does not include a dynamite shot for example if detonated in a shot hole).

Where $v_c$ is the velocity of the compressional wave, $\lambda_c$ at any frequency $f$ is given by Equation 6.

$$(6) \qquad \lambda_c = \frac{v_c}{f}$$

Although any desired directivity pattern can be used, elimination of side lobes makes the analysis of the system easier to understand. For no side lobes $$\sin n\Psi = 0 \text{ at } \beta = 90°$$

or $$n\Psi = \pi$$

Thus, where $n$ equals the number of geophones $$(7) \qquad n = \frac{\lambda_c}{s}$$

To momentarily summarize, Equation 3 gives the spacing between geophones for a given sub-array and Equation 7 gives the number of geophones for the array. From the two, one can determine the length of the array to satisfy the requirements given above. Other requirements on the length of the sub-array can be used if a different directional pattern is desired.

Attention will now be directed toward a consideration of the width of the individual sub-bands (for each sub-array) within the seismic band. It can be said in general that the directivity pattern in the vertical plane for a compressional wave of the highest frequency $f_2$ and the directivity pattern of the lowest frequency $f_1$ should be reasonably close to the directivity pattern of the center frequency $f_0$. It has been found that it is desirable to keep the frequency band within the approximate limits of the following equations:

$$(8) \qquad f_1 = f_0 - 0.1 f_0$$
$$(9) \qquad f_2 = f_0 + 0.1 f_0$$

Table I shows the sub-band widths and the spacing between the geophones for each sub-array, using Equations 8, 9 and 3 for a seismic frequency range from about 20 c.p.s. to about 79 c.p.s. The various sub-arrays are determined by starting with 20 as the smallest $f_1$ and using the equation that the sub-array bandwidth is equal to $$f_0 \pm 0.1 f_0$$

a combination of Equations 8 and 9.

The spacing of the geophones in each sub-array is determined from Equation 3. For an assumed velocity of 500 ft./sec. for the Rayleigh wave and a frequency of 24 c.p.s.

$$s = 1/2 \frac{500}{24} = \text{approximately } 10.5 \text{ feet}$$

This calculation is repeated for each frequency $f_2$ in Table I. The highest frequency, $f_2$, in each sub-band is used to determine the geophone spacing $s$ because this criterion will give good elimination of the Rayleigh waves throughout the sub-band.

TABLE I

| Sub-Array Designation: | Frequency Band Width (cycles per second) | | | Geophone Spacing (feet) |
|---|---|---|---|---|
| | $f_1$ | $f_0$ | $f_2$ | |
| A | 20 | 22 | 24 | 10.5 |
| B | 24 | 26.5 | 29 | 8.7 |
| C | 29 | 32 | 35 | 7.2 |
| D | 35 | 39 | 43 | 5.9 |
| E | 43 | 48 | 53 | 4.8 |
| F | 53 | 59 | 65 | 3.9 |
| G | 65 | 72 | 79 | 3.2 |

If it is assumed that the velocity of the compressional wave is 10,000 feet per second, then using Equation 6

$$c = \frac{10,000 \text{ feet per second}}{22 \text{ cycles per second}}$$
$$= \text{approximately } 455 \text{ feet at } 22 \text{ c.p.s.}$$

Using Equation 7 above to solve for $n$, then $n = 455/10.5 = $ about 43 geophones in the array whose center frequency is 22 cycles per second. The directivity pattern is calculated for 22 cycles per second using Equation 4 above. This is plotted on FIG. 1 and is illustrated as curve 10. As shown above and illustrated in FIG. 1 then for 22 cycles per second, 43 geophones spaced about 10.5 feet apart would have a directivity pattern having essentially no side lobes. Curve 12 in FIG. 1 represents the directivity pattern for frequency $f_2$ which is 24 cycles per second. Curve 14 represents the directivity pattern for $f_1$ or 20 cycles per second. It is clear that directivity patterns 12 and 14 are reasonably close to pattern 10. It has been found that Equations 8 and 9 apply over the normal frequency range of interest in seismic prospecting. In each of the sub-arrays the directivity pattern for the upper and lower frequencies, that is $f_1$ and $f_2$ approach the directivity pattern at the center frequency $f_0$. The beam pattern or directivity pattern at each center frequency is the same in each sub-array since $n$ and $s/\lambda_c$ are constant.

Figure 2:
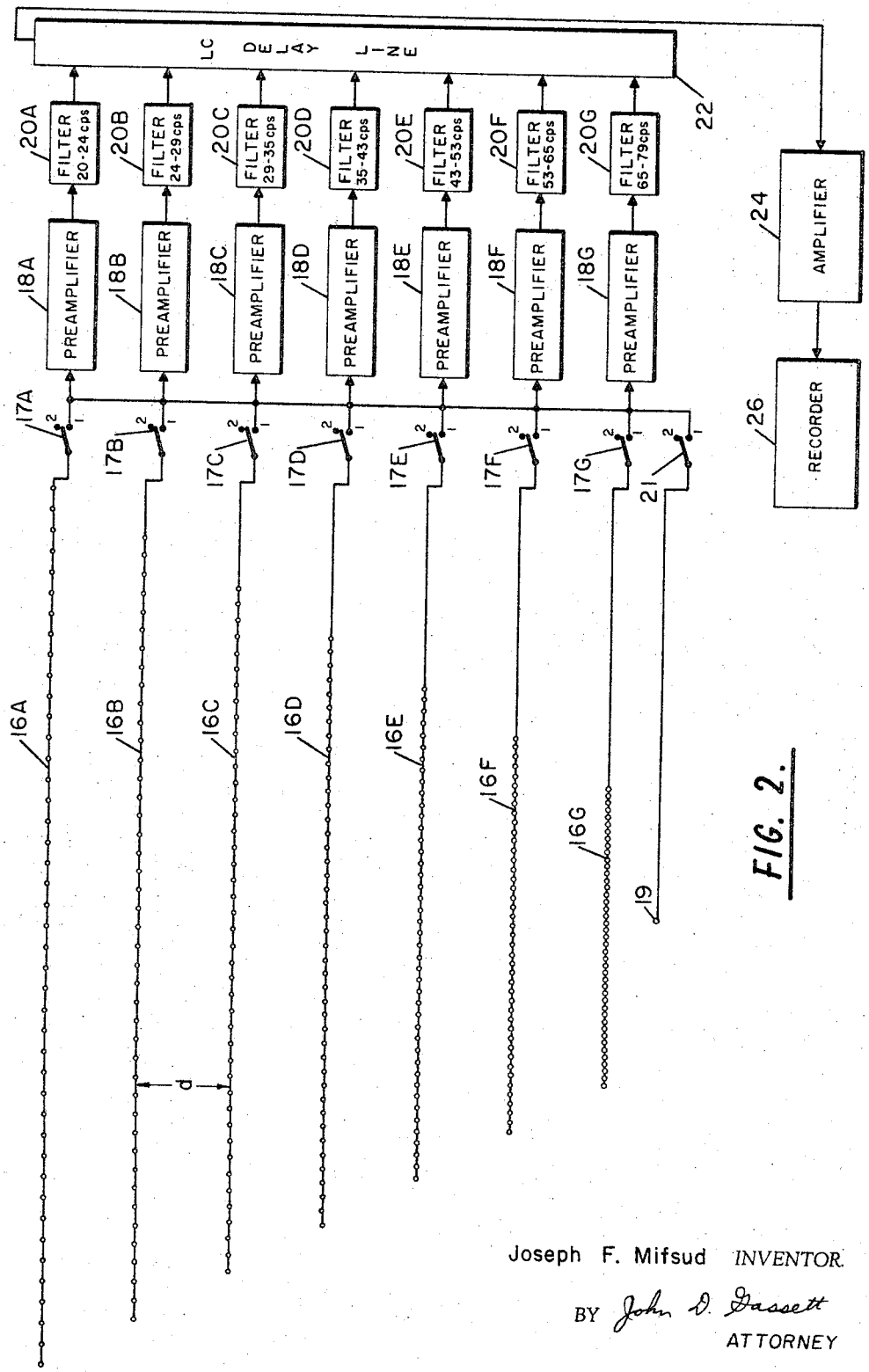
FIG. 2 shows a geophone sub-array and recording system for each of the smaller frequency sub-bands within a selected seismic frequency band.

Attention is now directed to FIG. 2 which illustrates an embodiment for recording a seismic signal at a geophone station using the seven sub-arrays, A through G, listed in Table I. Shown in FIG. 2 are sub-array 16A in which the geophones are 10.5 feet apart; sub-array 16B in which the geophones are 8.7 feet apart; sub-array 16C in which the geophones are 7.2 feet apart; sub-array 16D in which the geophones are 5.9 feet apart; sub-array 16E in which the geophones are 4.8 feet apart; sub-array 16F in which the geophones are 3.9 feet apart; and sub-array 16G in which the geophones are 3.2 feet apart. In this illustration, the geophones in any one sub-array are aligned. Other arrangements for each sub-array can be used in accordance with this invention so long as the directivity patterns of the sub-array are approximately the same. The various sub-arrays of FIG. 2 are spaced as close together as practical. In other words, $d$ approaches zero and in general is less than two feet.

The output of each geophone array 16A to 16G is fed through switch 17A to 17C (when in their number 1 position) to preamplifiers 18A to 18G respectively. The outputs of preamplifiers 18A to 18G are fed respectively to filters 20A to 20G respectively. Filter 20A is set to have a bandpass from 20 to 24 cycles per second. The response of the filter 20A to the end frequencies 20 and 24 c.p.s. is about one-half the response to the center frequency 22 cycles per second. This relationship of frequency response is typical in the other filters 20B to 20G. Filter 20B has a bandpass from 24 to 29 c.p.s.; filter 20C a bandpass of 29 to 35 c.p.s., filter 20D has a bandpass from 35 to 43 c.p.s., filter 20E has a frequency bandpass from 43 to 53 c.p.s., filter 20F from 53 to 65 c.p.s., and filter 20G from 65 to 79 c.p.s.

The output of each bandpass filter 20A to 20G is fed respectively to a tapped delay line 22. It is known that low frequencies are delayed more when passing through a bandpass filter than higher frequencies. Thus the high frequencies from bandpass filter 20G are fed to the input end of delay line 22 and are thus delayed more than the lower frequencies which are delayed progressively less; that is the output from the other filters 20F, 20E, 20D, etc. are delayed progressively less so that the various frequencies of the output of delay line 22 are in the proper phase. The output delay line 22 is fed to amplifier 24 and then to recorder 26.

By using the geophone embodiment illustrated in FIG. 2 essentially all the frequencies of the seismic signal in the range of 20 to 79 cycles per second have the same directivity pattern. For one thing this means that the geophone spacing is such that the different frequencies are reflected from essentially the same lateral portion of the subsurface interface. This aids in resolving lateral changes of lithology. Further by spacing the geophones as illustrated therein, the unwanted horizontal directional signals are largely eliminated.

Attention will now be directed toward an embodiment using fewer geophones that required in FIG. 2 to obtain the same directivity pattern for each sub-band. In this embodiment one line of geophones is used and a signal for each sub-band is tapped from a portion of the line representing the required length for that sub-band.

Figure 3:
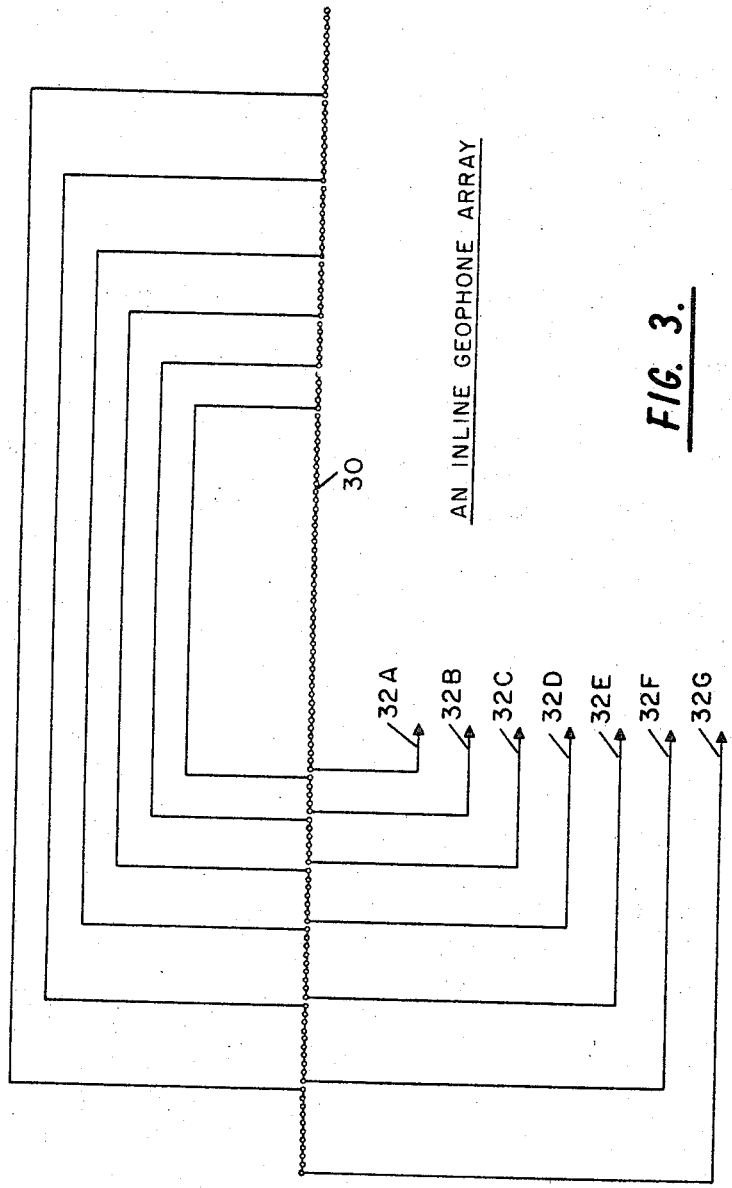
FIG. 3 illustrates a geophone array having equi-spaced geophones.

Shown in FIG. 3 is an inline geophone array for use with receiving 20 cycles per second to 79 cycles per second. There are 139 geophones shown. The middle group 30 has 43 geophones which are connected in series to a conductor 32A which can be for example a coaxial cable with a grounded shield. The 5 geophones on either side of the middle 43 are connected to a conductor 32B. The next 6 geophones on the outside of the pair of 5 geophones are connected in series to a conductor 32C. The next 7 geophones on the outside of the pair of 6 geophones are connected in series to conductor 32D. The next 9 geophones on the outside of the pair of 7 geophones are connected in series to conductor 32E. The next 10 geophones adjacent the last mentioned 9 geophones each way from the middle are connected in series to conductor 32F. The last 11 geophones on each end of the inline array are connected in series to conductor 32G. These geophones in FIG. 3 are equally spaced, being 3.2 feet apart. This spacing discriminates against the Rayleigh waves for frequencies up to about 79 c.p.s.

Figure 4:
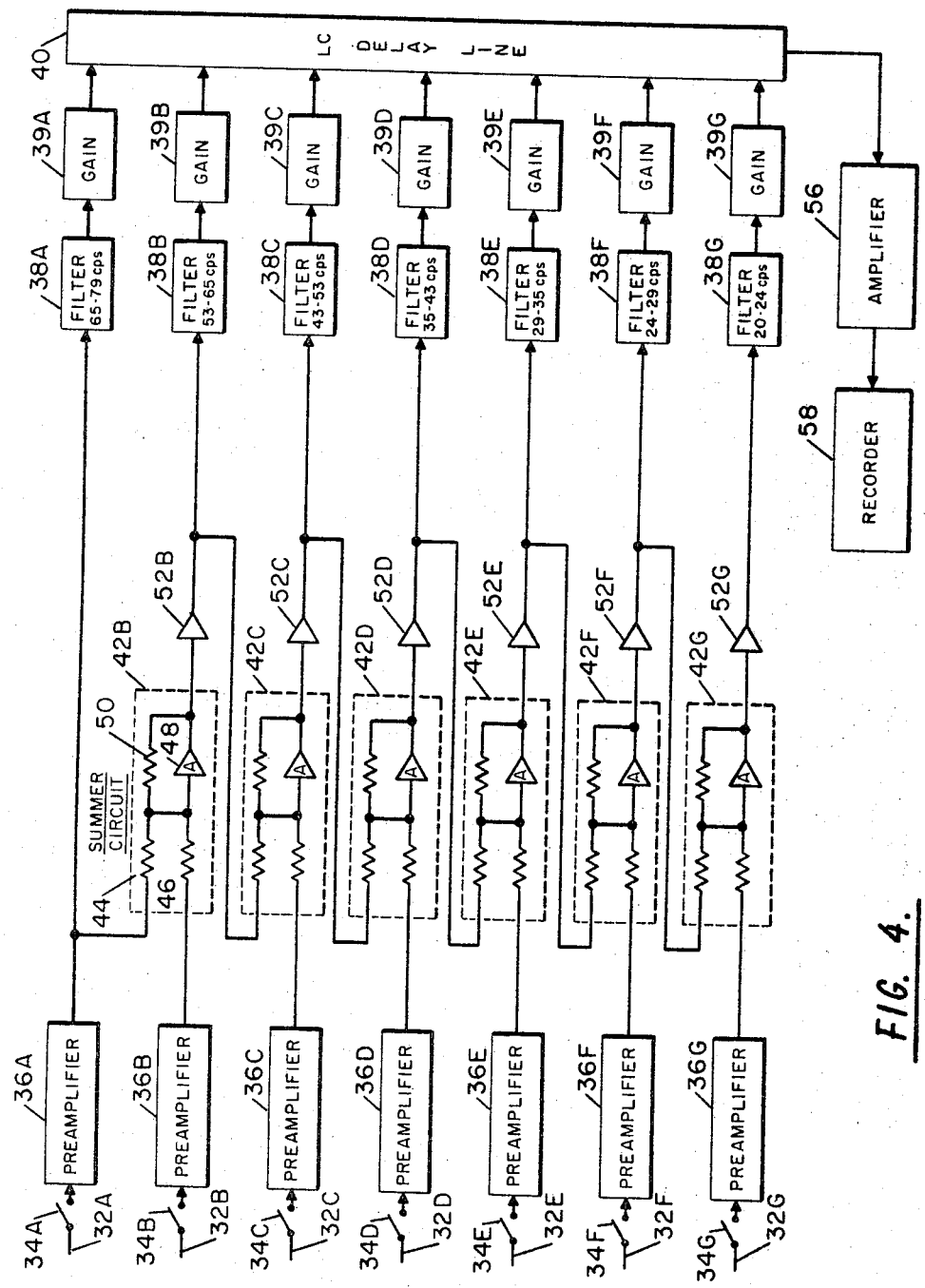
FIG. 4 shows an alternate embodiment for receiving equipment for an inline directional geophone array of FIG. 3.

Each conductor 32A to 32G is connected respectively to the input terminal of switches 34A to 34G of FIG. 4 whose output terminals are connected respectively to the input of amplifiers 36A to 36G. When the receiving equipment of FIG. 4 is used with the inline geophones of FIG. 3 as a directional receiver, switches 34A to 34G are closed or they may be closed in a special order or manner as described later.

The output of amplifier 36A is fed to a bandpass filter 38A which passes therethrough 65 to 79 cycles per second. Filter 38A is similar to and can be identical to filter 20G of FIG. 2. The output of filter 38A is fed to delay line 40 which can be similar to delay line 22 of FIG. 2.

The output of amplifier 36A is also fed to a summer circuit 42B where the output of amplifier 36A is added to the output of amplifier 36B. This in effect adds the output of the middle 43 geophones of FIG. 3 to the 5 geophones on either side thereof. The summer circuit 42B is designed so that its input impedance is high and it does not load down the output of amplifier 36A; thus the input to bandpass filter 38A will not be affected by any signal other than that from amplifier 36A. Summer circuit 42B includes a first resistor 44 to which the output of amplifier 36A is fed and a second resistor 46 to which the output of amplifier 36B is added. The output of resistors 44 and 46 are connected and are fed to an amplifier 48. The feedback loop of amplifier 48 has a resistor 50. The particular summer circuit 42B shown in FIG. 4 inverts the signal fed to it. Therefore, the output of the summer circuit 42B is fed to an inverter 52B. The output of inverter 52B is fed to bandpass filter 38B which is similar to bandpass filter 20F of FIG. 2. The inverted output from each summing circuit in addition to being fed to its bandpass filter is fed to the summing circuit just below it. Thus each bandpas filter 38A to 38G is fed thereto the signal from the number of geophones and the length indicated in Table II.

TABLE II

| Filter No. | No. of Geophones Connected Thereto | Length of Array Connected Thereto (feet) |
|---|---|---|
| 38A | 43 | 134 |
| 38B | 53 | 167 |
| 38C | 65 | 205 |
| 38D | 79 | 250 |
| 38E | 97 | 307 |
| 38F | 117 | 371 |
| 38G | 139 | 442 |

The output from each filter 38A to 38G is fed through variable gain control means 39A to 39G respectively, such as amplifiers or attenuators, to delay line 40 at the proper point so that each frequency sub-band is properly delayed, similarly as delay line 22 of FIG. 2. The output from delay line 40 is fed to amplifier 56. The output to amplifier 56 is fed to a recorder 58. The geophone array of FIG. 3 has essentially the same compressional wave directivity pattern as that of FIG. 2. This is true because $s/\lambda_c$ varies inversely as $n$ and consequently $n\,s/\lambda_c$ is constant. The length of each sub-array is inversely proportional to the frequency of the center of its frequency band. The spacing between the geophones of FIG. 3 is such that the spacing is a half wave length of the shortest incident wave length. This shortest wave length signal is the wave length of the Rayleigh wave at the highest frequency of the overall seismic band.

In some instances it may be desired to control the directivity pattern of the seismic source in a manner similar to that described above for geophones. The directivity pattern for each of the sub-bands of the source should be the same. One way in which directivity control of the source can be accomplished is by the arrangement in FIG. 5. Shown thereon are a plurality of rows 28A to 28G of locations for seismic generators. Each row has locations spaced the same as the spacing of the geophones in FIG. 2 and set out in Table I. At each location there is placed a seismic generator or vibrator. Each seismic generator is of the type to generate an output whose input into the earth is a sine wave whose frequency is $f_0$, the center of the sub-band, and the duration of the sine wave is such that the bandwidth of the signal is approximately the bandwidth of the sub-band. Fore example, those generators in row 28A generate a frequency of 22 cycles per second for a duration of about ¼ of a second. Likewise, rows 28B, 28C, 28D, 28E, 28F and 28G respectively have generators or vibrators which preferably generate seismic input signals of about 26.5, 32, 39, 49, 59, and 72 cycles per second respectively. In operation of this arrangement, the vibrators are operated simultaneously. With the arrangement of seismic generators shown in FIG. 5 the directivity pattern at each of the several frequencies or sub-bands generated is the same. The directivity pattern at each frequency is conveniently calculated from Equation 4 above. (Cos $\beta$ of Equation 4 applies for a surface vibrator or thumper—not an explosive source in a shot hole.) As the array shown in FIG. 5 for the source is the same as the array in FIG. 2 for the receiving geophones, the directivity pattern of the various frequency bands of the seismic source means is the same as the directivity pattern for the corresponding frequency bands at the receiver means. However, it is not necessary that the sub-bands of the source have the same directivity pattern as that of the geophones.

The reflected signals, from the single frequency vibrators, can be recorded with the geophone embodiment of FIG. 2 with switches 17A to 17G in their number 1 position. With this arrangement the source and the receiver are both directional. Alternately, if only source directivity is desired, the reflected signal can be deteced by a single geophone location. Such location can be a single geophone or a closely spaced group of geophones. This is accomplished in the embodiment of FIG. 2 by placing switches 17A through 17G in their number 2 position and connecting single geophone location 19 to filter 18A through 18G by placing switch 21 in its number 1 position. Normally switch 21 is in its number 2 position as shown.

Figure 5:
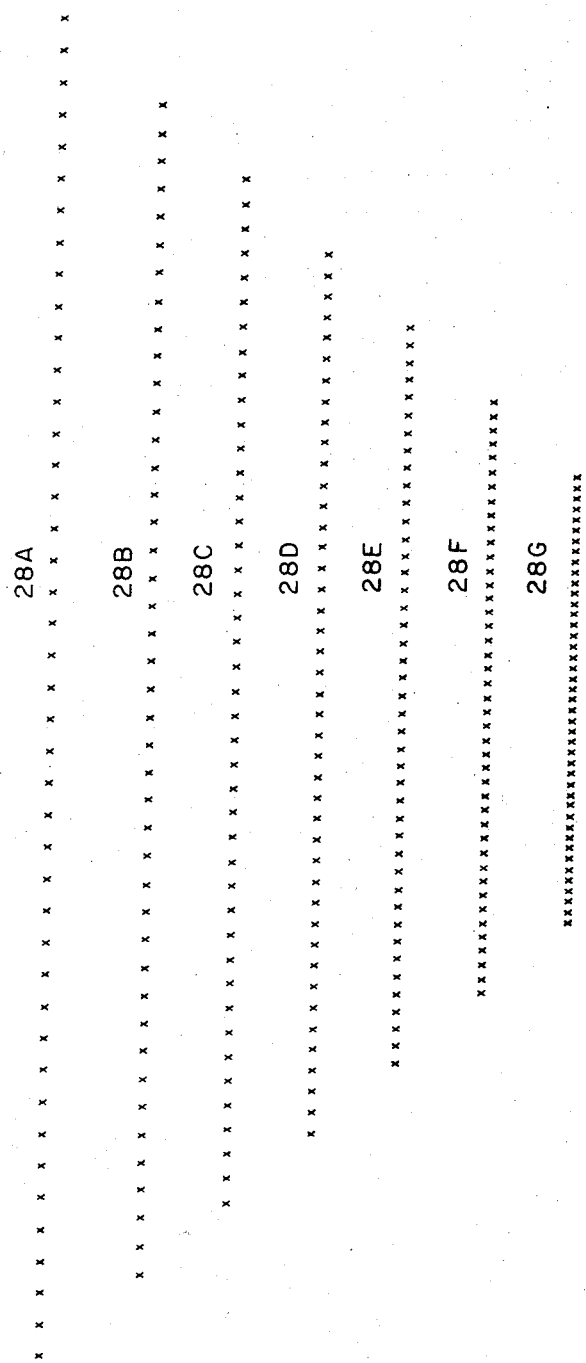
FIG. 5 illustrates an array of seismic source locations to obtain the same directivity pattern for different selected frequencies.

It will usually not be feasible to have a mechanical or hydraulic or other type sine wave generator available for each of the locations of the array of FIG. 5. As an alternate means of operation, one such seismic generator is used sequentially at the various points or locations. At each point or location in row 28A the seismic generator generates frequencies within the range of 20 to 24 cycles per second, similarly as shown above. The information is recorded on recorder 26 of FIG. 2 at each location. The seismic generator is placed at each location indicated on row 28B and generates the frequencies of 24 to 29 cycles per second. The reflected signal is detected by the geophones of FIG. 2 and is recorded on recorder 26 for each location using either the geophone array 16A to 16G, or the single geophone 19 as described above. The generation of a seismic signal and recording of its reflection is repeated for each of the other rows 28C to 28G at the designated frequencies. When a seismic sine wave has been generated at each of the stations of each row in FIG. 5, the records of each signal generated, which are recorded on recorder 26, are added to obtain a composite seismic signal whose source had the designated selected directivity pattern.

As an alternate way in using the seismic source pattern of FIG. 5, an explosive charge can be planted at each location in FIG. 5 instead of using a mechanical seismic generator. An explosive shot is a wide band seismic source and contains frequencies varying over the range of interest for seismic work, that is for example from 20 to 79 cycles per second. Thus the frequencies required for each sub-band is generated at each point or location of the pattern of FIG. 5. Additional frequencies outside the desired sub-band are also generated at these points, however, and as they are not primarily of interest and are filtered out by the receiving system as will be seen below, the system is not theoretically as efficient in that respect as the use of a system were essentially only the frequencies of interest are generated.

Other wide band seismic sources such as a thumper can also be used. The thumper technique is briefly described as lifting a heavy weight or mass above the surface of the earth and letting it drop. The force with which the mass strikes the ground imparts a wide band seismic signal into the earth.

In using the recording apparatus of FIG. 2 with a wide band source at the many locations of FIG. 5 for example, it is necessary that it be done in a certain manner. The length of the seismic source sub-array 28A is such as to generate a certain directivity pattern for a selected frequency sub-band. In the example given this is for the frequency of 20–24 cycles per second. With the use of a wide band seismic source, such as an explosion of dynamite, at each location in sub-array 28A, many frequencies are generated. However, all those outside the range of 20–24 c.p.c. will be disregarded. This is conveniently accomplished in using the recording system of the apparatus of FIG. 2 by placing switches 17B to 17G in their No. 2 position, and switches 17A in its No. 1 position. If dynamite is used, an explosion is set off at each location within a sub-array such as 28A for example. The dynamite shots within a sub-array can occur either simultaneously, sequentially, or in any groups of shots less than the total shots in a sub-array or combination thereof.

Reflected signals from the dynamite shots are passed through preamplifier 18A to bandpass filter 20A. The frequencies other than 20 to 24 cycles per second will be substantially rejected by the filter action. Thus the only frequencies which will be recorded for the locations of row 28A will be the band 20–24 cycles per second for the example shown. The geophone spacing of the geophone sub-array 16A can be the same as that shown above in FIG. 2 for controlling the directivity pattern of the receiving geophones. However, a single geophone can be used in place of the 43 geophones illustrated if a more directional receiver is not required. When the wide band seismic sources are generated at the locations illustrated for row 28B, switches 17A and 17C through 17G will be in their No. 2 position, and switch 17B will be in its No. 1 position. Thus, the only signals which will be recorded from the various seismic source initiations or energizations of 28B will be those within the filter range 24 to 29 c.p.s. All other frequencies will be rejected. In effect then, as far as the recording system is concerned, the sources of row 28B generated signals having frequencies of 24 to 29 c.p.s. This is repeated for each row 28C through 28G and switches 17A to 17G are opened and closed in a manner so that the corresponding bandpass filter 20A to 20G is receiving the detected reflected signal from the proper seismic source row 28A to 28G respectively. If all the shots in a row are simultaneously detonated, there will be seven separate signals recorded on recorder 26. In order to obtain a composite signal in which the source has essentially the same directivity over the complete seismic frequency band, these seven recorded signals are added. This is conveniently done by having recorder 26 a multichannel recorder capable of reproducing the seven signals simultaneously. Such a recorder is commercially available such as a "Decatrack" magnetic tape recorder manufactured by technology Instrument Corporation of California, 850 Lawrence Drive, Newbury Park, Calif. With this type of multitrack recorder the various signals are added together and recorded on another track.

Figure 6:
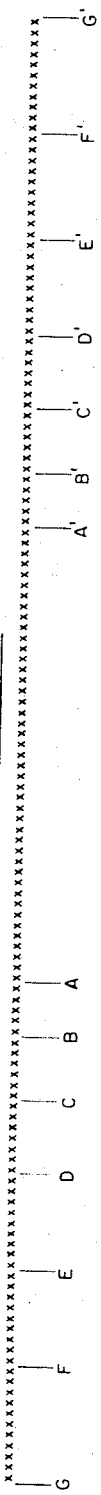
FIG. 6 illustrates a source array and the selectivity switching of the embodiment of FIG. 4 when used as the receiving equipment with an inline directional source array using a single source sequentially at the source locations of FIG. 3.

Attention is now directed to FIG. 6 which shows an inline directional source array with the source locations equally spaced. The length of the array of locations in FIG. 6 is about 442 feet and the locations are about 3.2 feet apart. This array is essentially identical to the array for the geophone locations shown in FIG. 3. Also the length of the array of FIG. 6 is esentially identical to the length of sub-array 28A of FIG. 5. It will be assumed that there is only one seismic source available and that it is initiated sequentially at each location of FIG. 6 beginning at the left and progressing to the right. It will further be assumed that the seismic source is capable of imparting a seismic signal into the earth and having frequencies within the range of 20 to 79 cycles per second. Before generating a seismic signal at any of the stations indicated in FIG. 6, switches 34 of FIG. 4 are all opened except switch 34G which is closed. The switch 34G stays closed and the other opened during the time that the seismic signal is generated at the first 11 locations, from location designated G to the location designated F. During the generation of a signal at the next 10 locations from F to E, switch 32F and 32G are both closed and the others remain open. During the energization at the next 9 locations, from E to D, switch 32E, 32F and 32G are all three closed and the others remain open. During the energization of the next 7 seismic locations from D to C, switches 32D to 32G are closed; during the next 6 locations from C to B, switches 32C to 32G are closed; during the next 5 locations, switches 32B to 32G are turned on; then for the next 43 locations, all the switches are closed. Then from A' to G' the switches are starting to be opened, from point A' to B' switch 32A is open and the others remain closed, from B' to C' only switches 32A, 32B are open, from C' to D' only switches 32A, 32B and 32C are open, from D' to E' only switches 32A, 32B, 32C and 3D are open, from E' to F' switches 32A through 32E are open, and from F' to G' switch 32F is added to the open ones and only 32G is closed.

The signal from delay line 40 is recorded on recorder 58 for each location illustrated in FIG. 6. After a seismic source has been initiated at each of these locations, each of the 139 records recorded on recorder 58 are added together to obtain a composite seismic signal. A single geophone station may be switched from 32G to 32A and back again in the sequence described above or the inline geophone array of FIG. 3 may be used. In the latter case both the source and the receivers have been adjusted to have the same directivity for the different frequencies. With the type of directional source and receiver described above, the low frequencies are accentuated because there are more sources and receivers at the low frequencies. Therefore, it will be necessary to attenuate the signal at the output of the low frequency bandpass filters. The attenuation should be inversely proportional to some function of frequency. The above operations can be modified. The switches 32A to 32G were opened and closed in various combinations. In the above description of the operation, in any one combination of opened and closed switches, there were a number of shots made sequentially at a number of locations. Alternatively, such shots can be made simultaneously, sequentially or in pairs or other ways.

To momentarily summarize the use of seismic sources so that the source has approximately the same directivity for the complete seismic band, it is decided first what the bandwidth of interest is for the seismic source. This bandwith is then divided into sub-bandwidths, for example using Equations 8 and 9. The spacing is then determined for each seismic source within each sub-band, for example, in accordance with Equation 3. The length of the array necessary for a given directivity is found from Equation 4. From this then it is determined (1) the number and size of sub-bands to be generated, and (2) the pattern or locations of the seismic source within each sub-band. It is seen that either narrow band seismic sources or wide band seismic sources can be used at locations within an array pattern for the various frequency sub-bands in the frequency band of interest. When using sources having essentially only those frequencies in the sub-band assigned it, sources can be generated or initiated either simultaneously or sequentially at all the locations for all the various sub-array patterns as illustrated for example in FIG. 5. The reflections can be detected by a single geophone and recorded in a conventional manner.

If, on the other hand, a wideband seismic source such as dynamite is used, the individual sources can be generated either simultaneously or sequentially at each location within any one, and only one, sub-band. Of course if a particular location of one sub-band coincides with the location of another sub-band, the one-shot can be used by both sub-bands. The reflections can be detected by a single geophone if desired, and the detected signal is filtered so that only those frequencies assigned to that sub-band are recorded. This is repeated for each sub-band. In other words, for each sub-band, although the source is a wideband source, only those frequencies which were used in determining the directivity pattern for that sub-band is "seen" or recorded as the other frequencies are filtered out. The recorded filtered outputs are then added to obtain a signal whose source is controlled such that the different sub-bands have the same directivity pattern or the directivity of the source is approximately the same for all the frequencies in the seismic band.

Figure 7:
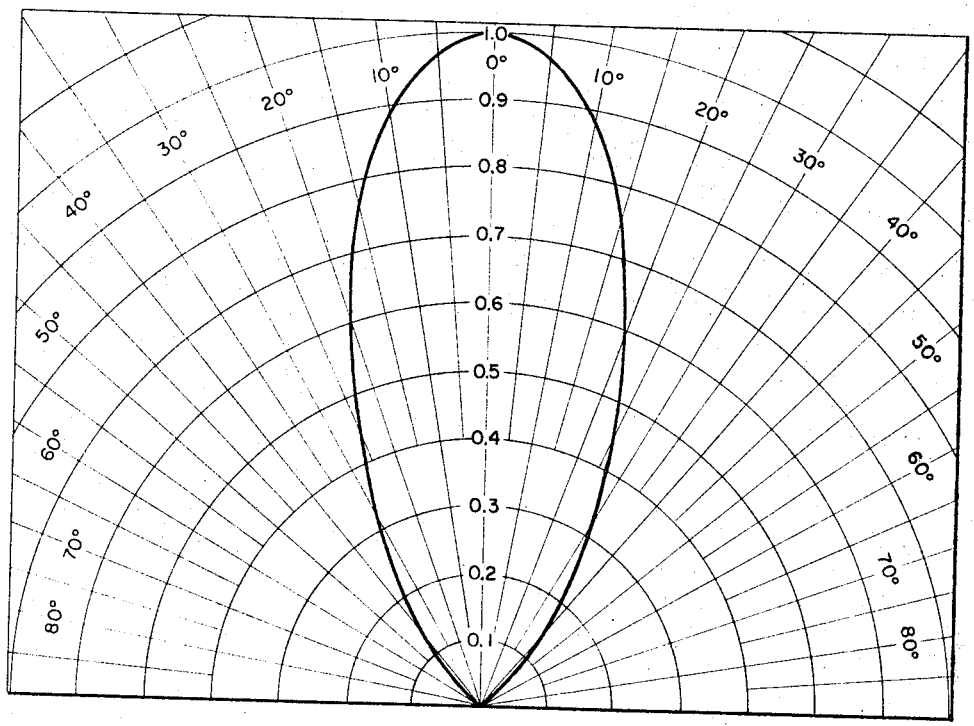
FIG. 7 shows the directivity pattern in the vertical plane through the array for a compressional wave when both the source and the receiver have the same directivity pattern.

FIG. 7 shows a directivity pattern in a vertical plane for a compressional wave when both the source and the receiver have the same directivity. That is, when the source, for example, takes the form as described above in regard to FIG. 6 and the receivers take the form as described above in regard to FIG. 2 or FIG. 3. (The directivity pattern of FIG. 7 was obtained from FIG. 1 by squaring and normalizing.) The directivity pattern of FIG. 7 applies exactly when the source and receiver occupy the same location at the surface of the ground. FIG. 7 is approximately correct when the compressional wave is reflected from a horizon at a depth which is large compared to the separation between source and receiver arrays.

It will be apparent to persons skilled in the art that many modifications of this invention are possible without departing from the spirit or scope thereof. Therefore, it is intended that the invention not be limited to the specific examples presented. It is therefore desired that only such limitations be imposed on the appended claims as are stated therein or required by the prior art.

What is claimed is:

1. An array of seismic transducers for use in seismic prospecting operations in which it is desired to detect a seismic signal having a band of frequency of interest of $f_1$ to $f_n$ which comprises:
    (a) a first sub-array containing a plurality of seismic transducers spaced at intervals selected to give a predetermined directivity pattern for a first frequency band within the frequency range $f_1$ to $f_n$;
    (b) a second sub-array containing a plurality of seismic transducers spaced at intervals selected to give a predetermined directivity pattern for a second frequency band within the frequency range $f_1$ to $f_n$, the directivity pattern for said second sub-array being the same as that for said first sub-array;
    (c) a first filter connected to the output of said first sub-array for selectively passing said first frequency band;
    (d) a second filter means connected to the output of said second sub-array for selectively passing said second frequency band; and
    (e) means to add the output of said first filter and said second filter.

2. Apparatus as defined in claim 1 including means to delay the output of one filter with respect to the output of the other filter before the two outputs are added.

3. Apparatus as defined in claim 1 in which the seismic transducers for each sub-array are spaced apart a distance equal to one-half $v_r/f$ in which $v_r$ is the velocity of the Rayleigh wave and $f$ is the highest frequency of the frequency band for that sub-array.

4. In the art of seismic prospecting, apparatus for detecting seismic signals which comprises at least two sets of seismic transducers, each set including a plurality of transducers arranged to give a predetermined directivity pattern; first filter means connected to the output of one of said sets of seismic transducers; a second filter means connected to the output of another of said sets of seismic transducers, said second filter means being responsive to a frequency band different from that of said first filter means; and means combining the output of said first filter means and said second filter means.

5. Apparatus as defined in claim 4 including means to delay the output of said first filter means with respect to the output of said second filter means before the two outputs are added.

6. Apparatus as defined in claim 4 in which the seismic transducers for each set are spaced a distance equal to one-half $v_r/f$ in which $v_r$ is the velocity of the Rayleigh wave and $f$ is the highest frequency of the frequency sub-band for that set.

7. In a system for seismic exploration in which the reflection of a seismic input signal having a selected frequency range of interest is detected and recorded, the improvement which comprises:
    (a) a first sub-array of seismic transducers having a predetermined directivity pattern for a first frequency sub-band within the selected frequency range,
    (b) a second sub-array of seismic transducers for a second frequency band within the selected frequency range having a predetermined directivity pattern the same as that for said first sub-array, and (c) means for recording seismic signals detected by transducers in said first and second sub-arrays.

8. In the art of seismic prospecting wherein a seismic disturbance is created at one point or points and energy reflected from subsurface discontinuities is detected at another point and recorded, the improvements in the seismic source which comprises:
  (a) a first set of means for generating a seismic input signal having frequencies within a first sub-band and a distinguishable directivity pattern;
  (b) a second set of means for generating a seismic input signal having frequencies within a second sub-band, the directivity pattern of said second set being the same as that for said first set;
  (c) a set of geophones for each sub-band, the directivity pattern being the same for each set of geophones;
  (d) a filter means for each set of geophones and responsive to the frequency sub-band thereof;
  (e) means connecting the output of the geophones of each set to its respective filter means; and
  (f) means to add the output from said filter means.

9. Apparatus as defined in claim 8 including means to delay the output of one filter means with respect to the output of another filter means before the two outputs are added.

10. Apparaus as defined in claim 8 in which the geophones for each set are spaced a distance equal to ½ $v_r/f$ apart in which $v_r$ is the velocity of the Rayleigh wave and $f$ is the highest frequency of the frequency sub-band for that set.

11. A method for initiating a seismic signal having a plurality of sub-bands which comprises:
  (a) selecting an array of seismic source locations for each sub-band such that the directivity pattern of each array for each sub-band is the same;
  (b) generating seismic input signals at each location selected in (a), each such input signal containing frequencies of the sub-band to which the location is assigned,
  (c) detecting reflections of the input signals and
  (d) recording the reflected signals thus detected.

12. A method of seismic prospecting
  (a) generating a first group of seismic input signals having frequencies within a first sub-band, said first group of signals having a predetermined directivity pattern;
  (b) generating a second group of seismic input signals having frequencies within a second sub-band, said second group of signals having a predetermined directivity pattern the same as that of said first group of seismic input signals;
  (c) detecting the reflections of said first group of seismic input signals and said second group of seismic input signals;
  (d) and recording the reflected signals thus detected.

13. In the art of seismic prospecting, apparatus for detecting seismic signals having at least a first sub-band and a second sub-band which comprises:
  (a) a plurality of spaced geophones, a first combination of said plurality of geophones forming a first array having a predetermined directivity pattern for said first sub-band and a second combination of said plurality of geophones forming a second array having a predetermined directivity pattern for said second sub-band which is the same as the directivity pattern for said first sub-band;
  (b) a first filter means being responsive to the frequencies in said first sub-band;
  (c) a second filter means being responsive to the frequency band of said second sub-band;
  (d) first means connecting said first combination of geophones to said first filter means;
  (e) second means connecting said second combination of geophones to said second filter means;
  (f) and means combining the output of said first filter means and said second filter means.

14. An apparatus as defined in claim 13 including means to delay the output of said first filter means with respect to the output of said second filter means before the two ouputs are added.

References Cited
UNITED STATES PATENTS

| | | | |
|---|---|---|---|
| 2,747,172 | 5/1956 | Bayhi | 181—.5 |
| 2,906,363 | 9/1959 | Clay | 181—.5 |
| 2,992,694 | 7/1961 | Musgrave et al. | 181—.5 |
| 3,066,754 | 12/1962 | Johnson | 181—.5 |
| 3,096,846 | 7/1963 | Savit et al. | 181—.5 |
| 3,142,815 | 7/1964 | Picou | 181—.5 |
| 3,185,250 | 5/1965 | Glazier | 181—.5 |

SAMUEL FEINBERG, *Primary Examiner.*

BENJAMIN A. BORCHELT, *Examiner.*

R. M. SKOLNIK, P. A. SHANLEY, *Assistant Examiners.*